Nov. 8, 1966  W. STELZER  3,283,504
PROPORTIONING VALVE
Filed July 31, 1964
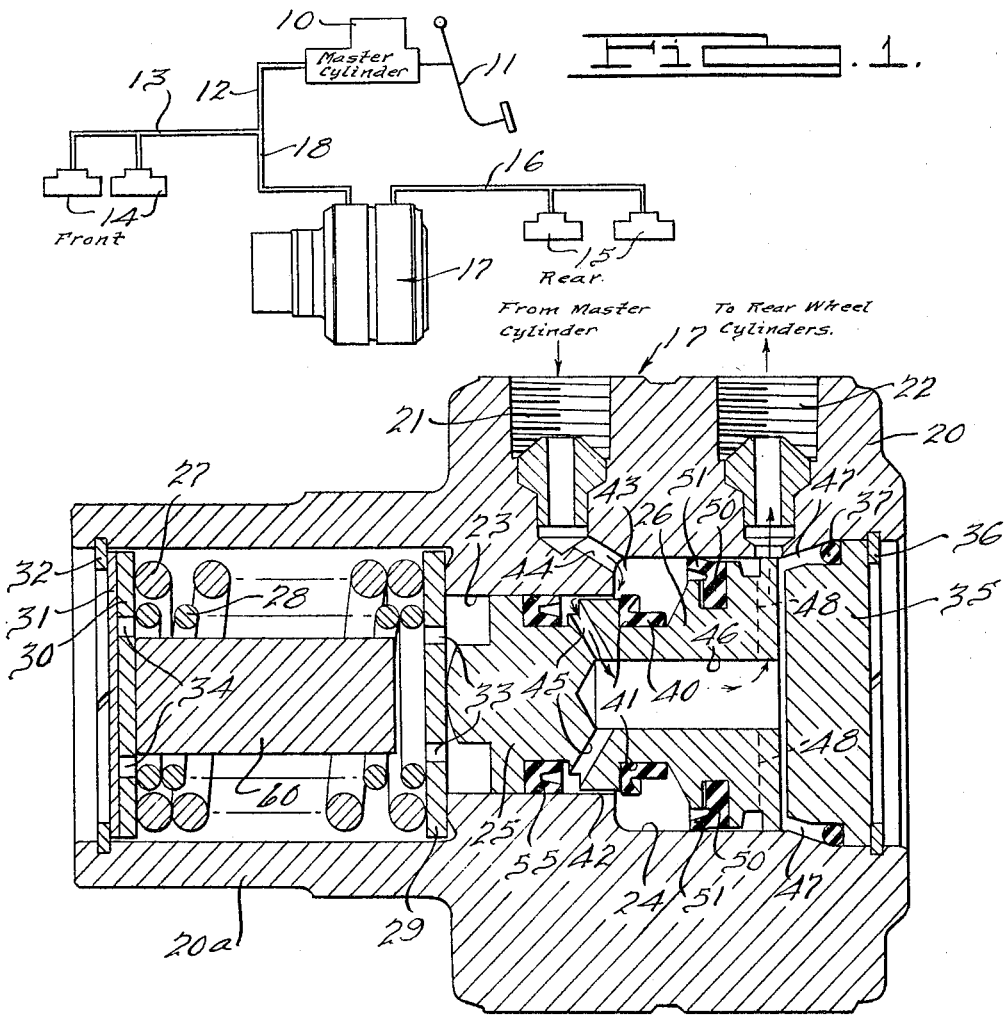
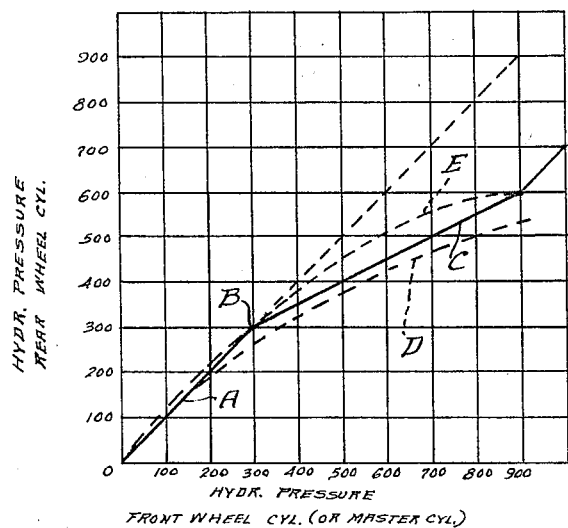
INVENTOR.
William Stelzer
BY
Harness, Dickey & Pierce
ATTORNEYS.

United States Patent Office 3,283,504
Patented Nov. 8, 1966

3,283,504
PROPORTIONING VALVE
William Stelzer, Bloomfield Hills, Mich., assignor to Kelsey-Hayes Company, Romulus, Mich., a corporation of Delaware
Filed July 31, 1964, Ser. No. 386,697
7 Claims. (Cl. 60—54.5)

This invention relates to hydraulic brake systems for automotive vehicles and, more particularly, to a proportioning valve to compensate for weight transfer in the vehicle due to deceleration during braking or for different pressure requirements of two sets of wheel cylinders wherein, for instance, disk brakes are used in the front and drum brakes are used in the rear, the disk brakes requiring a higher pressure.

The proportioning valve of this invention may be used to advantage with the metering valve shown in my copending application, Serial Number 387,893, filed August 6, 1964. The metering valve shown in the aforementioned application is adapted to correct the work distribution on the brakes in the lower and middle pressure ranges.

An object of the present invention is to so proportion the pressure transmitted to the front and rear brakes as to apply more fluid to the front brakes upon rapid deceleration of the vehicle or when the front brakes require more pressure than the rear brakes.

Another of the objects of this invention is to provide a device of this type which is so reduced in the number and character of its component parts as to approach the ultimate in structural simplicity and thereby create an economy in its manufacture, installation and maintenance costs.

The various objects and advantages, and the novel details of construction of one commercially practical embodiment of the invention, will become more apparent as this description proceeds, especially when considered in connection with the accompanying drawings, in which:

FIGURE 1 shows diagrammatically a hydraulic braking system embodying the device of this invention;

FIGURE 2 is an enlarged longitudinal sectional view through the valve of this invention; and FIGURE 3 is an explanatory graph showing the variations in pressure.

In the drawings, FIGURE 1 shows diagrammatically a hydraulic braking system for motor vehicles comprising a master cylinder 10 which is controlled by a brake pedal 11. The master cylinder is connected by piping 12 and 13 to the front wheel brake cylinders 14. The rear wheel cylinders, indicated by the reference character 15, are connected by piping 16 to a proportioning valve forming the subject matter of this application and indicated generally by the reference character 17. The piping 16 is connected to the outlet of the proportioning valve and the inlet for the proportioning valve is connected by piping 18 to the master cylinder.

The proportioning valve of this invention can be used to advantage in a hydraulic braking system employing a metering valve such as disclosed in my copending application, Serial Number 387,893, filed August 6, 1964, although it will be obvious, as this description proceeds, that it may be used independently of such a system.

The device of this invention serves to proportion the hydraulic pressure transmitted to the brake wheel cylinders of an automotive vehicle to compensate for weight transfer due to deceleration during braking or for different pressure requirements of two sets of wheel cylinders as, for instance, where disk brakes are used on the front wheels and drum brakes are used on the rear wheels, said disk brakes requiring a higher pressure. With the present invention, and in the example herein given, the proportioning valve starts to function when the pressure in the rear wheel cylinders has attained a predetermined pressure of, for instance, 300 p.s.i. With the present invention, both the front wheel cylinders and the rear wheel cylinders receive the same amount of pressure up to a predetermined amount, for instance 300 p.s.i., whereupon this proportioning valve starts to function to establish a predetermined ratio between the pressure transmitted to the rear wheel cylinders and the pressure transmitted to the front wheel cylinders.

In the drawings, FIGURE 2, the proportioning valve 17 is shown as comprising a housing or casing 20 having an inlet 21 connected to the piping 18 from the master cylinder and an outlet 22 connected by piping 16 to the rear wheel cylinders. The casing 20 is provided with a stepped cylinder having a smaller bore portion 23 and a larger bore portion 24 arranged in end-to-end relation. A stepped piston is arranged in the bores 23 and 24 having a small head 25 fitting in the small bore 23 and a large head 26 fitting in the larger bore 24. The piston 25–26 is slidably mounted in the bores 23 and 24 for axial movement therein.

The housing or casing 20 is provided with a tubular extension 20a for containing a biasing spring or springs here shown as outer and inner springs 27 and 28. Obviously, one or more than one spring may be utilized, as required. The springs 27–28 are adapted to bias the piston to the right, as viewed in FIGURE 2, and at one end engage a slidable plate 29 which engages an adjacent end of the piston. The other ends of the spring or springs engage a disk or plate 30 and the plate 30 is held in place by a spacer disk 31 which, in turn, is held in place by a split retaining ring 32 snapped into a groove in the extension 20a of the casing 20.

The spring or springs 27–28 are loaded at the factory to the proper degree by using a spacer plate 31 of proper thickness. In the example described in this application, the springs 27 and 28 are loaded to such an extent that it requires a 300 p.s.i. pressure on the piston to compress the springs.

The small head 25 of the piston is exposed to atmospheric pressure through the extension 20a of the casing. For this purpose, the plate 29 is provided with openings 33 and the disk 30 is provided with openings 34. Thus, as stated, the inner end of the piston is exposed to atmospheric pressure at all times.

The opposite end of the casing 20 is closed by a plug 35 which is retained in place by a split retaining ring 36 snapped into a groove in the casing 20. An O-ring type seal 37 is provided between the plug 35 and the casing 20.

The reference character 40 indicates a valve member or valve seal member formed of rubber, rubber-like material, or other suitable sealing material. The valve member or valve seal member is annular and rests in a groove 41 formed in the piston. The small head 25 of the piston is provided with an annular reduced portion forming a passageway 42 immediately adjacent the valve member 40.

This passageway 42 communicates at one end with an annular space or chamber 43 formed in the casing 20 which is connected by a passage or passageways 44 to the inlet 21 which, as stated, is connected to the master cylinder. The other end of the annular passage 42 is connected by one or more passages 45 with a central chamber 46 formed in the piston. This chamber 46 communicates at its right-hand end with a chamber 47 located at the end of the larger diameter bore 24. The larger piston head 26 is provided with one or more radially extending passages 48 which connect the chamber 46 with the outlet passage 22 which, as previously stated, is connected to the rear wheel cylinders.

When the piston 25–26 is moved to the left, against the action of the springs 27–28, the valve member 40 is caused to engage the bore 23 of the smaller cylinder and cut off communication between the inlet 21 and the outlet 22. When the valve 40 is in the open position illustrated in FIGURE 2, fluid pressure may enter the inlet 21, flow through passage 44 to the annular space or chamber 43, thence through the passage 42 and passage 45 to the chamber 46. From the chamber 46, the pressure fluid may flow through radial passages 48 to the outlet 22. As stated, when the valve member 40 engages the bore 23 of the smaller cylinder, this communication is cut off.

It will be understood that the chamber 47 is in communication with the rear wheel cylinders and passage of fluid from the chamber 47 to the chamber or annular space 43 is prevented by means of an annular cup-like sealing washer 50 having a flexible lip 51 engaging the bore 24 of the larger cylinder. If the pressure in chamber 47 should, at any time, be greater than that in the annular space 43, fluid may flow from the right to the left, as shown in FIGURE 2, past the flexible lip 51 into the annular space 43 and back to the master cylinder. However, this cup-like sealing washer prevents the flow of fluid from the annular space 43 to the chamber 47 and thus acts as a check valve.

The smaller piston head 25 is provided with an annular sealing member 55 to seal the piston against the atmosphere to which the left-hand end of the piston is exposed. The annular seal 55 is subject to the atmospheric pressure on one side and the lower rear wheel cylinder pressure on its other side.

In operation, if the springs 27–28 have been set to oppose a pressure of 300 p.s.i., the pressure from the master cylinder will enter the inlet 21 and flow past the valve seal 40 through the passages 45 to the chamber 46 through the radial passages 48 to the outlet 22, which is connected to the rear wheel cylinders and, at the same time, pressure flows to the front wheel cylinders. This part of the operation of the device is indicated by line A in the graph, FIGURE 3, which shows that both front and rear wheel cylinders receive the same pressure up to the point B. After this point has been reached, the pressure in the chamber 47 acting on the right-hand end of the larger piston head 26 moves the piston to the left against the action of the springs 27–28 and the pressure acting on the smaller piston area at the left until the valve member 40 engages the bore 23 in the smaller cylinder. This cuts off communication between the master cylinder and rear wheel cylinders, as will be obvious. Any further increase in master cylinder pressure alternately opens and closes the valve 40 so that a different ratio between the pressure to the front wheel cylinders and the rear wheel cylinders is established. This ratio is indicated by line C in the graph. In the graph, the ideal ratio between the front and rear wheel cylinders when the vehicle is lightly loaded is indicated by the dotted line D and the ideal ratio between the front and rear wheel cylinders when the vehicle is more heavily loaded is indicated by the dotted line E. It is to be noted that the ratio indicated by the line C is substantially intermediate lines D and E, so that an overall proper ratio between the front and rear wheel cylinders is obtained with this device. As shown at point F in the graph, the pressure on the rear wheel cylinders is 600 p.s.i. and the pressure on the front wheel cylinders is 900 p.s.i.

Further increases in master cylinder pressure act upon the inner end of the larger head 26 of the piston to assist the springs 27–28 to move the piston to the right to open the valve member 40. Then, as pressure builds up in chamber 47, the piston is again moved to the left to close the valve member 40 so that, as stated above, the valve alternately opens and closes to control the flow of fluid to the rear wheel cylinders and thus establish the proper ratio between the pressure to the front wheel cylinders and the rear wheel cylinders, indicated by line C in the graph, FIGURE 3.

A stop 60 may be provided in the tubular extension 20a to limit movement of the piston toward the left, as viewed in FIGURE 2. This stop 60 may conveniently be carried by the plate 30.

The objects and advantages of this invention are attained by a construction which is so reduced in the number and character of its component parts as to approach the ultimate in structural simplicity. The simplicity of the device creates an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. In a hydraulic brake system comprising a master cylinder, front and rear wheel brake cylinders, and means hydraulically connecting said master cylinder to said wheel cylinders, that improvement which comprises a proportioning valve device in the hydraulic connection between said master cylinder and rear wheel cylinders for maintaining differential pressures in the front and rear wheel cylinders during a portion of the braking operation, said device comprising a casing having an inlet connection with said master cylinder and an outlet connection with said rear wheel cylinders, said casing being formed with two cylinders of different diameter bores, a stepped piston having a small head and a larger head fitting said cylinders and slidably mounted for axial movement therein, a space in said casing intermediate said heads connected to said inlet, a chamber at the end of said larger diameter cylinder opposite said space connected to said outlet, passage means connecting said inlet and space to said chamber and outlet, a valve seal member secured to said piston intermediate said heads adapted to engage the bore of said smaller cylinder upon movement of said piston in one direction to close said passage means, the end of said small head being exposed to atmospheric pressure, and spring means normally biasing said piston into position wherein said valve seal member is disengaged from said smaller bore to open said passage means between said inlet and outlet.

2. In a hydraulic brake system comprising a master cylinder, front and rear wheel brake cylinders, and means hydraulically connecting said master cylinder to said wheel cylinders, that improvement which comprises a proportioning valve device in the hydraulic connection between said master cylinder and rear wheel cylinders for maintaining differential pressures in the front and rear wheel cylinders during a portion of the braking operation, said device comprising a casing having an inlet connection with said master cylinder and an outlet connection with said rear wheel cylinders, a cylinder formed in said casing having small and large bores in end-to-end relation, a stepped piston having a small head and a larger head fitting said bores and slidably mounted for axial movement therein, an annular space in said casing intermediate said heads, said annular space being connected to said inlet, a chamber at the end of said larger diameter bore opposite to and spaced from said annular space, said chamber being connected to said outlet, a passage connecting said annular space to said chamber, a valve member secured to said piston intermediate said heads adapted to close the passage between said annular space and chamber upon movement of the piston in one direction, the end of said small head being exposed to atmospheric pressure, and spring means normally biasing said piston to a position wherein said value member is open to permit the flow of pressure fluid from said inlet to said outlet.

3. In a hydraulic brake system comprising a master cylinder, front and rear wheel brake cylinders, and means hydraulically connecting said master cylinder to said wheel cylinders, that improvement which comprises a proportioning valve device in the hydraulic connection between said master cylinder and rear wheel cylinders for maintaining differential pressures in the front and rear wheel cylinders during a portion of the braking operation, said device comprising a casing having an inlet connection with said master cylinder and an outlet connection with said rear wheel cylinders, said casing being formed with two cylinders of different diameter bores, a stepped piston having a small head and a larger head fitting said cylinders and slidably mounted for axial movement therein, a space in said casing intermediate said heads connected to said inlet, a chamber at the end of said larger diameter cylinder opposite said space connected to said outlet, passage means connecting said inlet and space to said chamber and outlet, a valve member secured to said piston intermediate said heads adapted to engage the bore of said smaller cylinder upon movement of said piston in one direction to close said passage means and spring means for biasing said piston in one direction to move said valve member to open position whereby pressure fluid flows unimpeded to said outlet and said rear wheel cylinders until the pressure in said rear wheel cylinders and chamber reaches a predetermined amount whereupon said piston is moved against the action of said spring means to move said valve member to closed position, any further increases in the master cylinder pressure acting on said piston to move the piston in the opposite direction to open said valve member whereupon said valve member is alternately opened and closed upon increases in said master cylinder pressure so that pressure fluid flows to said rear wheel cylinders at a lower rate and a predetermined ratio between the pressure to the rear wheel cylinders and the pressure to the front wheel cylinders is established.

4. In a hydraulic brake system comprising a master cylinder, front and rear wheel brake cylinders, and means hydraulically connecting said master cylinder to said wheel cylinders, that improvement which comprises a proportioning valve device in the hydraulic connection between said master cylinder and rear wheel cylinders for maintaining differential pressures in the front and rear wheel cylinders during a portion of the braking operation, said device comprising a casing having an inlet connection with said master cylinder and an outlet connection with said rear wheel cylinders, said casing being formed with two cylinders of different diameter bores, a stepped piston having a small head and a larger head fitting said cylinders and slidably mounted for axial movement therein, a space in said casing intermediate said heads connected to said inlet, a chamber at the end of said larger diameter cylinder opposite said space connected to said outlet, passage means connecting said inlet and space to said chamber and outlet, a valve member secured to said piston intermediate said heads adapted to engage the bore of said smaller cylinder upon movement of said piston in one direction to close said passage means, and spring means for biasing said piston in one direction to move said valve member to open position whereby pressure fluid flows unimpeded to said outlet and said rear wheel cylinders until the pressure in said rear wheel cylinders and chamber reaches a predetermined amount whereupon said piston is moved against the action of said spring means to move said valve member to closed position, the end of said small head being exposed to atmospheric pressure, any further increases in the master cylinder pressure acting on the inner end of the larger head of said piston to assist said spring means to move the piston in the opposite direction to open said valve member, thereafter said valve member being alternately opened and closed upon increases in said master cylinder pressure whereby pressure fluid flows to said rear wheel cylinders at a lower rate than that of the master cylinder so that a predetermined ratio between the pressure to the rear wheel cylinders and the pressure to the front wheel cylinders is established and maintained.

5. A device as described in claim 2 in which a cup-like seal is interposed between said annular space and chamber which permits the flow of pressure fluid from said chamber to said annular space but prevents the flow of pressure fluid from said annular space to said chamber.

6. A device as described in claim 2 in which said small piston head is provided with a seal engaging said small bore and positioned so as to be subjected only to the lower rear wheel cylinder pressure.

7. In a hydraulic braking system for a motor vehicle having a master cylinder to supply pressure to a set of front wheel cylinders and a fluid transmitting line to supply pressure to a set of rear wheel cylinders, in combination, a proportioning valve having a body with an inlet in communication with the master cylinder and an outlet in communication with the set of rear wheel cylinders, a small cylindrical bore and a larger cylindrical bore in said body, a stepped piston having a small head and a larger head fitting said bores and being slidably arranged for axial movement therein, a space intermediate said heads, said inlet leading to said space, a chamber for fluid acting on said larger head opposite said space, said chamber being connected with said outlet, a valve seal member secured to said stepped piston intermediate said heads adapted to seal off said small bore upon axial movement of said stepped piston in a direction entering said smaller bore, passage means intermediate said valve seal member and said small head in communication with said chamber and said outlet, the end of said small head being exposed to a lower pressure such as atmospheric pressure, and spring means urging said stepped piston into a normal position where said valve seal is disengaged from said small bore to provide an open passage from said inlet to said outlet.

No references cited.

MARTIN P. SCHWADRON, *Primary Examiner.*

R. P. BUNEVICH, *Assistant Examiner.*